US009195737B2

(12) United States Patent
Tang et al.

(10) Patent No.: US 9,195,737 B2
(45) Date of Patent: Nov. 24, 2015

(54) METHOD AND SYSTEM FOR CONTENT CATEGORIZATION

(71) Applicant: HUAWEI TECHNOLOGIES CO., LTD., Shenzhen, Guangdong (CN)

(72) Inventors: Jie Tang, Shenzhen (CN); Yiling Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/179,974

(22) Filed: Feb. 13, 2014

(65) Prior Publication Data

US 2014/0164421 A1    Jun. 12, 2014

Related U.S. Application Data

(63) Continuation of application No. 12/830,152, filed on Jul. 2, 2010, now Pat. No. 8,719,332, which is a continuation of application No. PCT/CN2008/072526, filed on Sep. 25, 2008.

(30) Foreign Application Priority Data

Jan. 23, 2008   (CN) .......................... 2008 1 0065626

(51) Int. Cl.
*G06F 15/16* (2006.01)
*G06F 17/30* (2006.01)
(Continued)

(52) U.S. Cl.
CPC .... *G06F 17/30643* (2013.01); *G06F 17/30705* (2013.01); *H04L 63/08* (2013.01); *H04L 12/585* (2013.01)

(58) Field of Classification Search
CPC .............. H04L 29/06; H04L 29/08072; H04L 29/0809; H04L 29/06047; H04L 63/10; H04L 67/146; H04L 67/14; G06Q 30/02
USPC .......................................... 707/758; 709/203
See application file for complete search history.

(56) References Cited

U.S. PATENT DOCUMENTS 6,085,225 A     7/2000 Nakajima et al.
7,213,069 B2 *  5/2007 Anderson et al. ............. 709/225
(Continued)

FOREIGN PATENT DOCUMENTS

CN    1798048 A    7/2006
CN    1863211 A    11/2006
(Continued)

OTHER PUBLICATIONS

Open Mobile Alliance,"Categorization Based Content Screening 1.0," Draft Version 1.0, Dec. 13, 2007, San Diego,CA; total 26 pages.
(Continued)

*Primary Examiner* — Tauqir Hussain
(74) *Attorney, Agent, or Firm* — Huawei Technologies Co., Ltd.

(57) ABSTRACT

Embodiments of the present invention disclose a method for content categorization, where the method comprises transmitting, by a content categorization request entity, a categorization ability negotiation request to a content categorization providing entity to request the categorization ability of the content categorization providing entity; receiving the categorization capability of the content categorization providing entity returned by the content categorization providing entity. Furthermore, embodiments of the present invention disclose a system for content categorization, content categorization request entity and content categorization providing entity. Categorization ability negotiation or subscription helps to learn the content categorization ability so that the content categorization request entity or content categorization providing entity may mutually and accurately acquire content categorization capability information without delay.

14 Claims, 7 Drawing Sheets

(51) Int. Cl.
*H04L 29/06* (2006.01)
*H04L 12/58* (2006.01)

(56) References Cited

U.S. PATENT DOCUMENTS

| | | |
|---|---|---|
| 8,024,471 B2 | 9/2011 | Sinclair et al. |
| 2002/0091835 A1 | 7/2002 | Lentini et al. |
| 2002/0120754 A1* | 8/2002 | Anderson et al. ............ 709/229 |
| 2003/0088639 A1 | 5/2003 | Lentini et al. |
| 2004/0117426 A1 | 6/2004 | Rudkin et al. |
| 2004/0199593 A1 | 10/2004 | Simpson |
| 2005/0015453 A1 | 1/2005 | Chin et al. |
| 2006/0053488 A1* | 3/2006 | Sinclair et al. ................ 726/22 |
| 2006/0069787 A1 | 3/2006 | Sinclair et al. |
| 2007/0124312 A1 | 5/2007 | Simpson et al. |
| 2007/0260603 A1 | 11/2007 | Tuscano et al. |
| 2008/0014974 A1 | 1/2008 | Zhao et al. |
| 2009/0276850 A1 | 11/2009 | Peng |
| 2012/0036177 A1 | 2/2012 | Tang et al. |

FOREIGN PATENT DOCUMENTS

| | | |
|---|---|---|
| CN | 1905564 A | 1/2007 |
| JP | 2004193693 A | 7/2004 |
| JP | 2006018635 A | 1/2006 |
| JP | 2011510410 A | 3/2011 |
| RU | 2223537 C2 | 2/2004 |
| WO | 2006069967 A1 | 7/2006 |
| WO | 2007128185 A1 | 11/2007 |

OTHER PUBLICATIONS

Yukishige Fukunaga et al: A Model-Based Development Support System for Composite Web Services with BPEL; Department of Information and Telecommunication Engineering, Faculty of Mathematical Sciences and Information Engineering, Nanzan University; May 31, 2005; total 12 pages.

Open Mobile Alliance; Categorization Based Content Screening Framework Architecture; Draft Version 1.0; Apr. 19 2007; total 28 pages.

Paul Resnick et al; PICS: Internet Access Controls Without Censorship; Communications of the ACM, 1996, vol. 39 (10), pp. 87-93; total 8 pages.

Jim Miller et al; Rating Service and Rating Systems(and Their Machine Readable Descriptions); Version 1.1; Oct. 31, 1996; total 19 pages.

Yuji Horii et al; A study on video transmission systems using broadband network; Information Technology R&D Center, Mitsubishi Electric Corporation; Feb. 29, 1996; total 8 pages.

Maria Grazia Buscemi et al: Constraint-Based Policy Negotiation and Enforcement for Telco Services; Theoretical Aspects of Software Engineering, 2007. TASE'07.; First Joint IEEE/IFIP Symposium ON, IEEE, Piscataway, NJ, USA; Jun. 1, 2007; XP0031178880; total 10 pages.

* cited by examiner

METHOD AND SYSTEM FOR CONTENT CATEGORIZATION

CROSS-REFERENCE TO RELATED APPLICATIONS

This application is a continuation of U.S. patent application Ser. No. 12/830,152, filed Jul. 2, 2010, which is a continuation of International Application No. PCT/CN2008/072526, filed on Sep. 25, 2008. The International Application claims priority to Chinese Patent Application No. 200810065626.5, filed on Jan. 23, 2008. The afore-mentioned patent applications are hereby incorporated by reference in their entireties.

FIELD OF THE INVENTION

Embodiments of the present invention mainly relate to the communications technology, and more particularly to a method, a system, a content categorization request entity, and a content categorization providing entity for content categorization.

BACKGROUND OF THE INVENTION

With the rapid development of network technology and various information technologies, the range of content accessible to users gradually eliminates temporal and spatial limits, and greatly increases the probability that users will be exposed to such content as pornography, violence and viruses that are unhealthy and menacing to the client terminals, so that there is an ever-increasing demand for the screening of communication content. Currently available screening technologies include list screening technology, keyword screening technology, template screening technology, categorization screening technology, and so on.

Referring to FIG. 1, which is a structural schematic view illustrating a conventional Categorization Based Content Screening (CBCS) system, the system mainly comprises two parts: a content categorization providing entity 201 and a content screening unit 202. In practical application, the CBCS system 200 may simultaneously include these two units, and it is also possible for the two units to constitute a server. That is, the categorization providing entity 201 and the content screening unit 202 can operate in the same and single server. It is further possible for the two units to separately operate each in a different server, in which case networking and deployment are carried out upon actual demand. The content screening unit 202 in the CBCS system 200 and the content categorization request entity 100 (such as a content provider) external to the CBCS system 200 can both obtain categorical information of a certain content from the content categorization providing entity 201 via a CBCS-1 interface, and the content categorization providing entity 201 further provides a CBCS-3 interface capable of associating content information with category upon request. The internal and the external entities that request operations from the content categorization providing entity via the CBCS-1 interface and the CBCS-3 interface uniformly are called as the content categorization request entity 100, where the request operations include requesting content categorization and requesting association of content with category.

At present, with the development of the content categorization interfaces such as the CBCS-1 interface, the interfaces have been gradually multiplied in types from the initial simple modes (such as output of category obtained via content or content-introduced input) to involve multiplicity of parameters (such as the content categorization rule, content identification, digital abstract algorithm, and digital signature algorithm, etc.). These parameters are present with plural choices and possibilities; for example, the content categorization rule includes the Entertainment Software Rating Board (ESRB), and the Motion Picture Association of America (MPAA), etc. On the other hand, besides the parameters involved in the CBCS-1 request message, the response message also involves some parameters. Similarly, the content categorization providing entity associates the content information with the category, and it likewise deals with the similar problems of a plurality of selections and determinations of the parameters supported by the content categorization providing entity. With the enrichment of such categorization processing, parameters are simultaneously generated that are supported by different content categorization entities (including the content categorization request entity and the content categorization providing entity). In other words, the categorization abilities might be different.

In view of the conventional systems discussed above, the inventors found during implementation of the present invention that the categorizing ability of the content categorization providing entity relates to many aspects and corresponds to multiplicity of parameters, but there lacks an explicit and efficient mechanism for categorization ability negotiation between the content categorization request entity and the content categorization providing entity. The result is often that the content categorization providing entity cannot categorize the content for the provided content information or associate the content with the category, or that the content categorization result provided by the content categorization providing entity is rendered invalid, thus severely affecting the validity of content categorization or association.

SUMMARY OF THE INVENTION

In view of the above, technical solutions provided in the embodiments described below solve a problem of lack of a mechanism for categorization ability negotiation between the content categorization request entity and the content categorization providing entity in conventional systems, where the problem leads to failure due to absence of support for the categorization ability when the content categorization request entity requests the content categorization providing entity for operations related to content categorization, or when the content categorization providing entity transmits the content categorization request entity the operation results related to the content categorization.

Embodiments of the present invention provide a method for content categorization. The method comprises the following steps:

a content categorization request entity transmitting a categorization ability negotiation request to a content categorization providing entity, for requesting categorization ability of the content categorization providing entity; and receiving the categorization ability of the content categorization providing entity returned by the content categorization providing entity.

Embodiments of the present invention further provide a method for content categorization. The method comprises the following steps:

receiving a categorization ability negotiation request transmitted from a content categorization request entity; and returning categorization ability of a content categorization providing entity to the content categorization request entity.

Embodiments of the present invention further provide a method for content categorization. The method comprises the following steps:

subscribing to categorization ability of a content categorization providing entity from the content categorization providing entity; and receiving the categorization ability transmitted from the content categorization providing entity.

Embodiments of the present invention yet provide a method for content categorization. The method comprises the following steps:

receiving a subscription request for categorization ability of a content categorization providing entity transmitted from a content categorization request entity; and transmitting the categorization ability of the content categorization providing entity to the content categorization request entity.

Embodiments of the present invention further provide a system for content categorization. The system comprises:

a content categorization request entity, adapted to transmit a categorization ability negotiation request to a content categorization providing entity to request categorization ability of the content categorization providing entity, and receive the categorization ability of the content categorization providing entity returned by the content categorization providing entity; and a content categorization providing entity, adapted to receive a categorization ability negotiation request transmitted from a content categorization request entity, and return the categorization ability of the content categorization providing entity to the content categorization request entity.

Embodiments of the present invention further provide a content categorization request entity. The content categorization request entity comprises:

a categorization ability requesting unit, adapted to request categorization ability from a content categorization providing entity; and a categorization ability receiving unit, adapted to receive the categorization ability of the content categorization providing entity.

Embodiments of the present invention further provide a content categorization providing entity. The content categorization providing entity comprises:

a categorization ability interacting unit, adapted to receive a categorization ability request transmitted from a content categorization request entity; and a categorization ability providing unit, adapted to return categorization ability of the content categorization providing entity to the content categorization request entity.

As can be seen from the foregoing technical solutions, embodiments of the present invention learn of the categorization ability of the content categorization providing entity via the categorization ability negotiation or the subscription request, and it is further possible for the content categorization providing entity to learn of the categorization ability supported by the content categorization request entity via the categorization ability negotiation or subscription. Therefore, it is made possible for the content categorization request entity or the content categorization providing entity to obtain the mutual content categorization ability information in a detailed, clear, exact and timely manner, and thus the rate of success of requests and operations related to content categorization is increased.

DETAILED DESCRIPTION OF THE DISCLOSED EMBODIMENTS

Embodiments of the present invention provide a method for content categorization. The method includes: a content categorization request entity transmitting a categorization ability negotiation request to a content categorization providing entity to request categorization ability of the content categorization providing entity; or subscribing to categorization ability of a content categorization providing entity from the content categorization providing entity; receiving the categorization ability of the content categorization providing entity transmitted from the content categorization providing entity; further requesting content categorization or requesting association of content with category according to the obtained categorization ability of the content categorization providing entity, and further providing categorization ability supported by the content categorization request entity to the content categorization providing entity, wherein the content categorization providing entity can provide the supported content categorization result to the content categorization request entity according to the categorization ability supported by the content categorization request entity.

Figure 1:
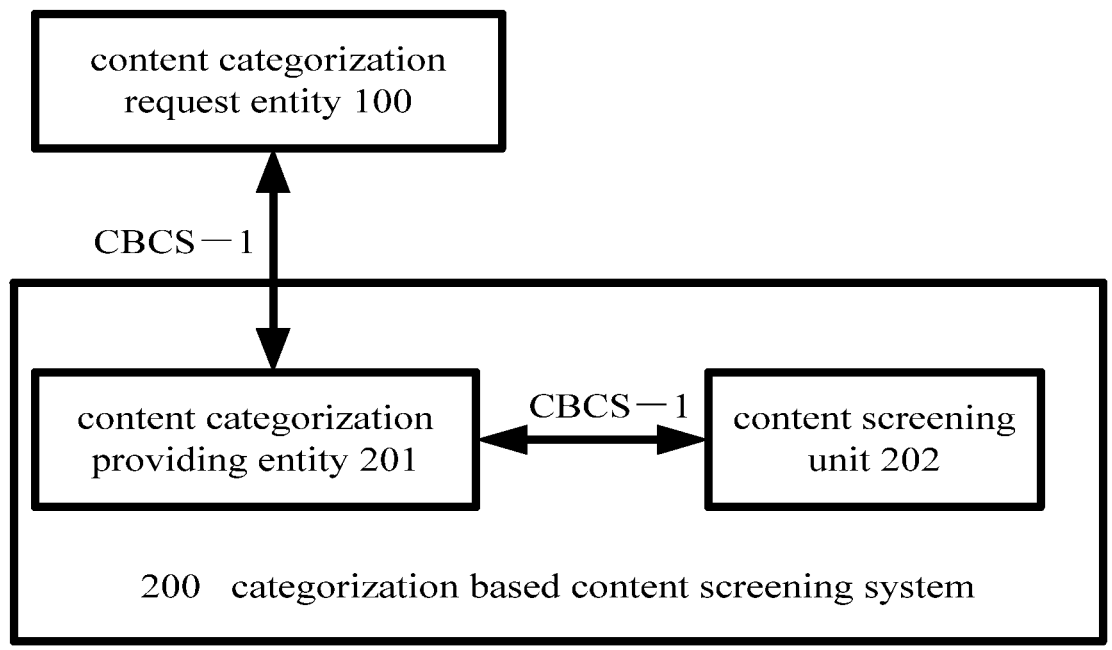
FIG. 1 is a structural schematic view illustrating a conventional Categorization Based Content Screening (CBCS) system.
Figure 2:
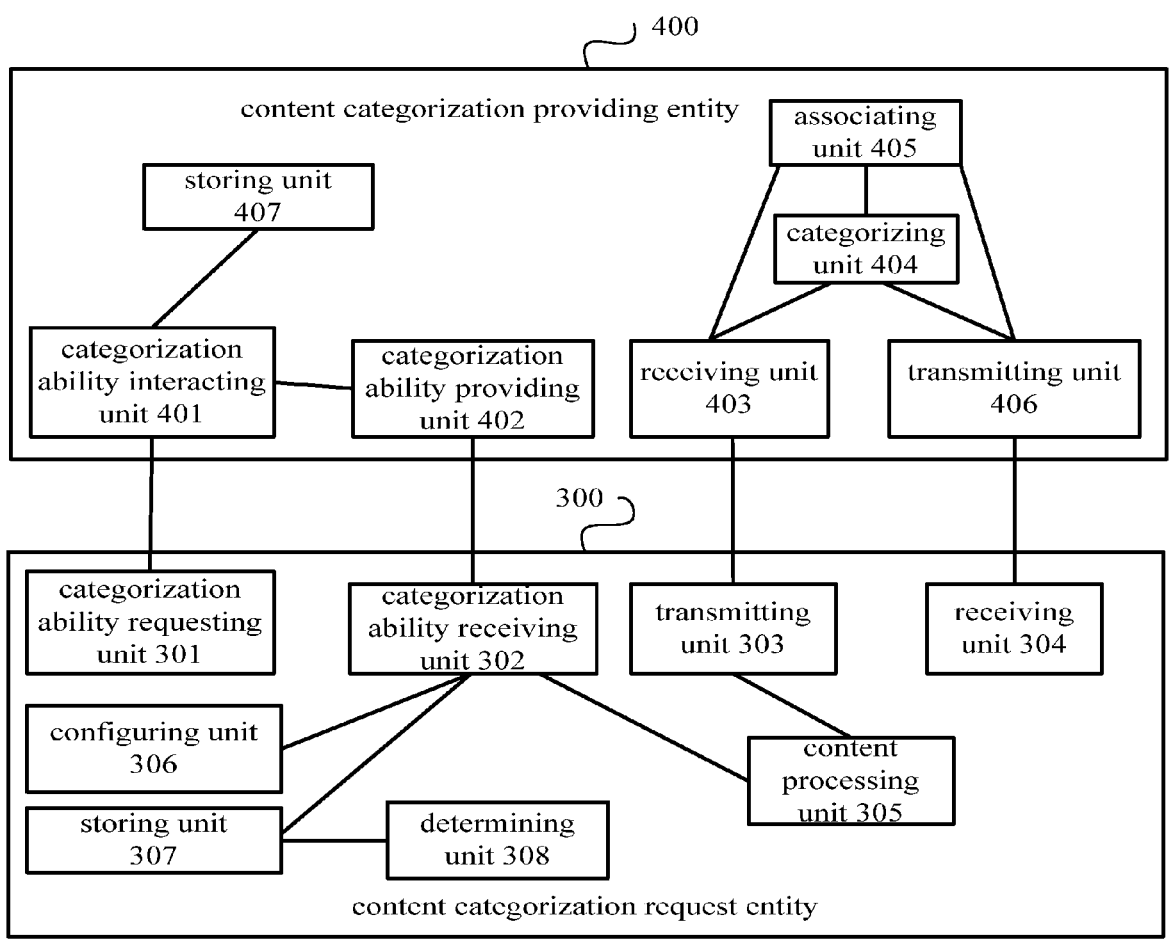
FIG. 2 is a structural schematic view illustrating a system for content categorization provided by the embodiments of the present invention.

Referring to FIG. 2, which is a structural schematic view illustrating a system for content categorization provided by the embodiments of the present invention, the system specifically includes: a content categorization request entity 300 and a content categorization providing entity 400. The content categorization request entity 300 can specifically be a content providing system controlled by an operator or a service provider; the content screening unit 202 in the CBCS system 200 in FIG. 1; or a content information and category associating system controlled by an operator or a service provider. The content categorization providing entity 400 can specifically be a content categorization server, or the CBCS system 200 consisting of a content categorization server and a content screening server.

The content categorization request entity 300 includes a categorization ability requesting unit 301 and a categorization ability receiving unit 302.

The categorization ability requesting unit 301 requests categorization ability from the content categorization providing entity.

The categorization ability receiving unit 302 receives the categorization ability of the content categorization providing entity.

The categorization ability requesting unit 301 can specifically be a negotiating unit that transmits a categorization ability negotiation request to the content categorization providing entity 400 to request the categorization ability of the content categorization providing entity. The categorization ability receiving unit 302 receives the categorization ability of the content categorization providing entity returned by the content categorization providing entity 400.

The negotiating unit can further carry the categorization ability supported by the content categorization request entity 300 in the categorization ability negotiation request to be provided to the content categorization providing entity 400, or receive the categorization ability negotiation request transmitted by the content categorization providing entity 400, and return the categorization ability supported by the content categorization request entity 300 to the content categorization providing entity 400.

Specifically, it is possible to send a categorization ability negotiation request to the content categorization providing entity 400. The request can include information of the categorization ability supported thereby and related to content categorization or content and category association, for instance, information indicating that the categorization requester can provide the content in the format of a packet compressed by ZIP or RAR, etc., or information indicating the acceptable content categorization rule result, etc. The categorization ability receiving unit 302 receives the categorization ability returned by the content categorization providing entity 400, and can specifically receive the response to the categorization ability negotiation request transmitted thereto by the content categorization providing entity 400 according to the categorization ability negotiation request. The response to the request includes the categorization ability information supported by the content categorization providing entity 400 and related to the content categorization. The categorization ability of the content categorization providing entity includes, but not limited to, one of the followings or a combination thereof: a content type supported by the content categorization providing entity; a content coding format supported by the content categorization providing entity; a content language supported by the content categorization providing entity; a content size supported by the content categorization providing entity; a content locator supported by the content categorization providing entity; a content identifier supported by the content categorization providing entity; a content abstract type supported by the content categorization providing entity; a digital signature algorithm supported by the content categorization providing entity; and a content categorization rule supported by the content categorization providing entity.

The categorization ability requesting unit can specifically be a subscribing unit that subscribes to the categorization ability of the content categorization providing entity from the content categorization providing entity 400. The categorization ability receiving unit 302 receives the categorization ability transmitted from the content categorization providing entity 400. Specifically, it is possible to subscribe the categorization ability of the content categorization providing entity and the changing items of the categorization ability thereof from the content categorization providing entity 400, and to receive the categorization ability transmitted from the content categorization providing entity 400 as well as the changed categorization ability.

During the process of practical application, the content categorization request entity can further include, but not limited to, at least one of the following units:

a transmitting unit 303 that requests content categorization or requests association of content with category from the content categorization providing entity 400 according to the category ability of the content category providing entity;

a receiving unit 304 that receives categorization result of the content or association result returned by the content categorization providing entity 400;

a content processing unit 305 that correspondingly processes content information to be categorized according to the categorization ability received from the content categorization providing entity, and requests content categorization from the content categorization providing entity 400 via the transmitting unit with the processed content information;

a configuring unit 306 that configures categorization ability and/or confidence verification ability supported by the content categorization request entity according to the categorization ability received from the content categorization providing entity;

a storing unit 307 that stores the categorization ability of the content categorization providing entity obtained from the content categorization providing entity; and a determining unit 308 that determines whether valid categorization ability of the content categorization providing entity has been stored, and notifies, if valid categorization ability of the content categorization providing entity has been stored, the content processing unit to process the content information according to the stored categorization ability of the content categorization providing entity.

The transmitting unit 303 requests content categorization or requests association of content with category from the content categorization providing entity with the processed content information.

The content categorization providing entity 400 comprises a categorization ability interacting unit 401 and a categorization ability providing unit 402.

The categorization ability interacting unit 401 receives the categorization ability transmitted from the content categorization request entity 300.

The categorization ability providing unit 402 returns the categorization ability of the content categorization providing entity to the content categorization request entity 300.

The categorization ability interacting unit 401 can specifically be a negotiating unit that receives the categorization ability negotiation request transmitted from the content categorization request entity 300. Moreover, the negotiation request can include the categorization ability supported by the content categorization request entity. The categorization ability providing unit 402 returns the categorization ability of the content categorization providing entity to the content categorization request entity 300.

The negotiating unit can further transmit the categorization ability negotiation request to the content categorization request entity 300, and receive the categorization ability supported by the content categorization request entity returned by the content categorization request entity 300.

Specifically, the negotiating unit can obtain the categorization ability supported by the content categorization request entity and related to the content categorization by receiving the categorization ability negotiation request supported by the content categorization request entity, and carry the categorization ability supported thereby by returning the message in response to the categorization ability negotiation request, for instance, such information of the categorization ability as the different content formats and parameters supported by the content categorization providing entity, or check algorithm of the pre-categorization information provided by the content categorization providing entity.

Additionally, the categorization ability interacting unit 401 can specifically be a subscribing unit that receives a subscription request transmitted from the content categorization request entity 300 for subscribing to the categorization ability of the content categorization providing entity. The categorization ability providing unit 402 transmits the categorization ability (which can further include changed categorization ability) of the content categorization provider to the content categorization request entity according to the subscription request. The subscribing unit can further subscribe the categorization ability supported by the content categorization request entity from the content categorization request entity 300, and receive the categorization ability transmitted from the content categorization request entity as well as the changed categorization ability.

During the process of practical application, the content categorization providing entity can further include, but not limited to, one of the following units:

a receiving unit 403 that receives a request for content categorization or a request for association of content with category transmitted by the content categorization request entity 300 according to the categorization ability of the content categorization providing entity, and specifically receives a request message for content categorization or an association message transmitted by the content categorization request entity according to the categorization ability of the content categorization providing entity, which message includes information of the content to be categorized or relevant information necessary for association;

a categorizing unit 404 that categorizes the content according to the request for content categorization or performs categorization according to the categorization ability supported by the content categorization request entity;

an associating unit 405 that associates the content with the category according to the request for content and category association;

specifically, the categorizing unit 404 and the associating unit 405 are used to categorize or associate the content information according to the request for content categorization or the request for association of content with category of the content categorization request entity 300; if no category information is carried in the request for association, it is necessary to firstly perform categorization and then association; alternatively, content categorization is performed according to the categorization ability supported by the content categorization request entity and related to the content categorization, and the content categorization result is provided to the content categorization request entity 300 via the transmitting unit 406;

a transmitting unit 406 that transmits result of categorizing the content or result of associating the content with the category to the content categorization request entity 300; and a storing unit 407 that stores the categorization ability supported by the content categorization request entity returned by the content categorization request entity 300, and updates the stored categorization ability of the content categorization providing entity according to change information of the categorization ability returned by the content categorization request entity.

As should be noted, the categorization ability negotiation can be realized by different modes, for instance, it can be realized by transmitting content categorization ability request message and corresponding response message, such as by transmitting content categorization ability negotiation message and corresponding response message; it can also be realized by attaching categorization ability descriptive information in authentication interaction process, or in content categorization request message and corresponding response message, or in association of content with category request message or association request response message. The specific realization is described in greater detail in the following embodiments of the method process. The embodiments of the present invention are not restricted to these modes of implementation, as other methods for realizing categorization ability negotiation also fall within the protection scope of the embodiments of the present invention.

Figure 3:
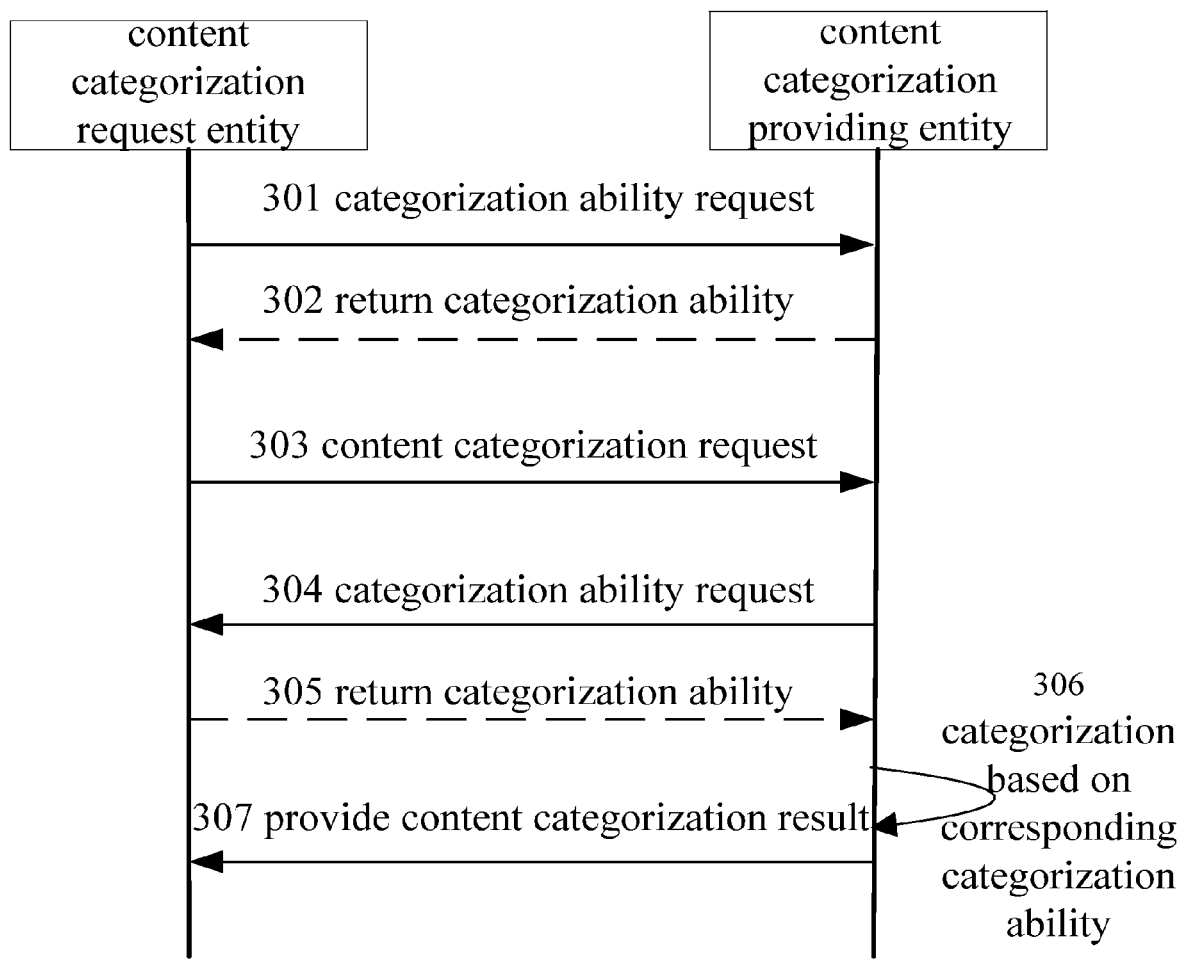
FIG. 3 is a flowchart illustrating a method for content categorization provided by Embodiment 1 of the present invention.

Example is taken below with the aforementioned system applied in a content categorization process based on categorization ability negotiation to describe the specific process of the embodiments of the present invention in greater detail. As shown in FIG. 3, which is a flowchart illustrating a method for content categorization provided by Embodiment 1 of the present invention, the following steps are specifically included:

Step 301: The content categorization request entity transmits a content categorization ability request, such as a content categorization ability negotiation request message, to the content categorization providing entity.

Because the categorization ability supported by the content categorization providing entity is not known, such as the supported content format, language, content identifier type, content locator type and packing format, the content categorization request entity needs to obtain the categorization ability of the content categorization providing entity. This is to provide corresponding content information to the content categorization providing entity for performing content categorization.

Step 302: The content categorization providing entity returns the corresponding content categorization ability information according to the categorization ability supported thereby. The information includes, but not limited to, different content formats, coding methods, languages supported by the content categorization providing entity, or information of categorization ability such as the digital signature algorithm provided by the content categorization providing entity for the pre-categorized content to perform confidence verification, wherein when the content categorization request entity is a content screening entity, the content screening entity configures the confidence verification ability of itself, such as the confidence verification algorithm, according to the confidence verification algorithm obtained from the content categorization providing entity. This can ensure check on the pre-categorized content.

Step 303: The content categorization request entity transmits a content categorization request carrying therewith the content information to be categorized or address information of the content according to the categorization ability supported by the content categorization providing entity, and the content categorization providing entity obtains the corresponding content information according to the address information.

Step 304: The content categorization providing entity transmits the content categorization ability request, such as a content categorization ability negotiation request message, to the content categorization request entity.

Because the content categorization providing entity does not know the categorization ability supported by the content categorization request entity, the content categorization providing entity needs to obtain the categorization ability, such as the categorization rule, supported by the content categorization request entity prior to performing content categorization. This is to transmit the content categorization ability request message to the content categorization request entity.

Step 305: The content categorization request entity returns the categorization ability supported thereby, like such information as the supported categorization rule, etc.

Step 306: The content categorization providing entity performs content categorization according to the content information provided by the content categorization request entity and in accordance with the categorization ability supported by the content categorization request entity, such as the supported standard categorization result.

Step 307: The content categorization providing entity feeds back the corresponding content categorization result to the content categorization request entity.

As should be noted, the specific sequence of the aforementioned categorization ability negotiating steps 304-305 and the negotiating steps 301-302 can be flexibly set, for instance, by setting steps 304-305 immediately after steps 301-302, in other words, the content categorization request entity transmits the content categorization request after completing categorization ability negotiation between the two.

Moreover, the process of association of content with category is consistent in principle with the aforementioned process of content categorization, and the different steps between the two rest in the following: If there is categorization that corresponds to the content required to be categorized, steps 306-307 are changed to performing association of content with category by the content categorization providing entity, and the specific association process can be to establish a correspondence between the content and the corresponding categorization, to maintain and store the correspondence, and can also be to perform association in other modes to return the result of association to the content categorization request entity. If there is no categorization performed corresponding to the content information, step 306 is retained, that is to say, the content is first categorized, and the step of association of content with category is then added; in other words, content and category are associated according to the categorization result of step 306, and the association result is returned to the content categorization request entity.

Figure 4:
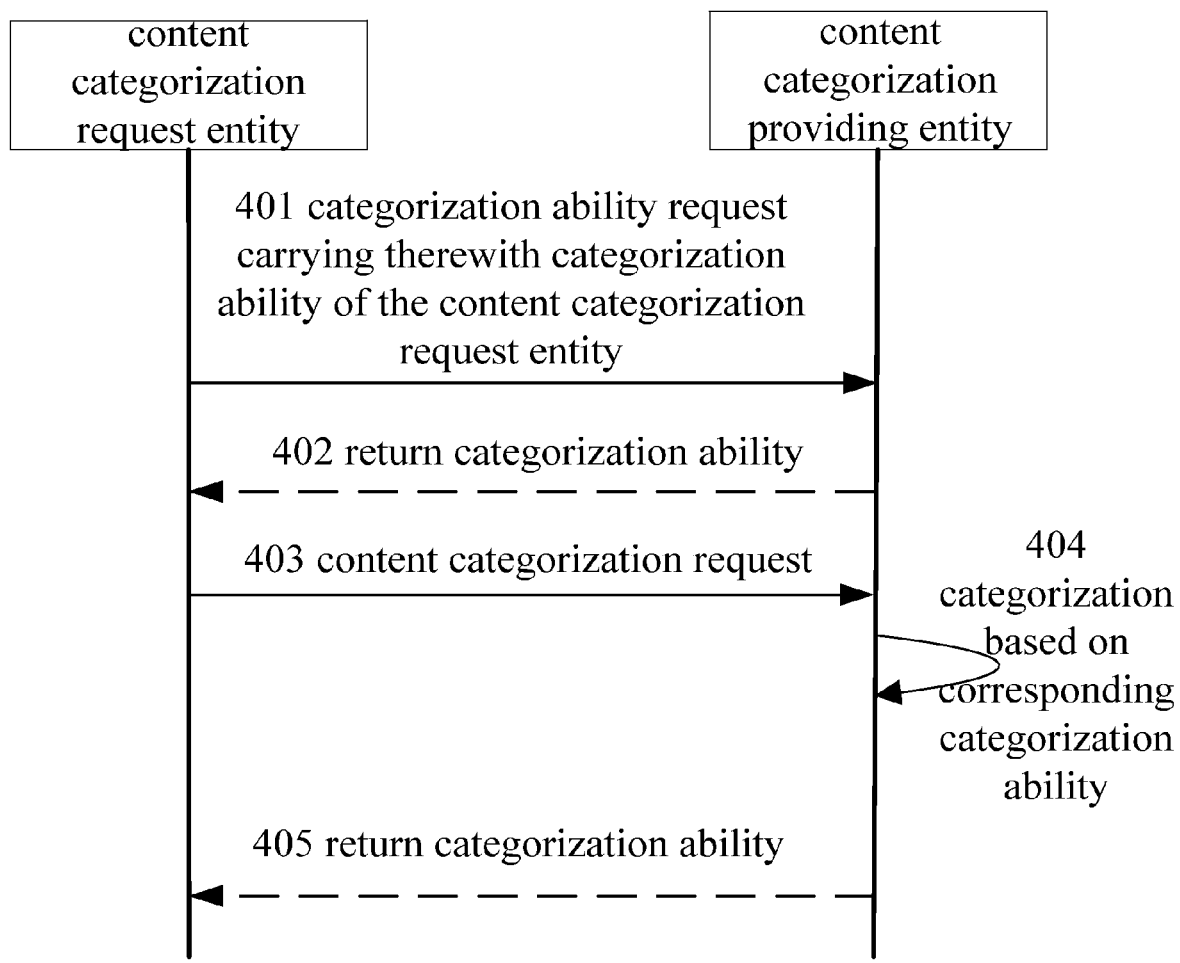
FIG. 4 is a flowchart illustrating a method for content categorization provided by Embodiment 2 of the present invention.

As shown in FIG. 4, which is a flowchart illustrating a method for content categorization provided by Embodiment 2 of the present invention, the following steps are specifically included:

Step 401: The content categorization request entity transmits a content categorization ability request, such as a content categorization ability negotiation request message, to the content categorization providing entity.

The content categorization ability negotiation request message includes the categorization ability supported by the content categorization request entity per se, and the categorization ability supported by the content categorization providing entity requested from the content categorization providing entity.

Step 402: The content categorization providing entity returns its categorization ability.

Step 403: The content categorization request entity transmits a content categorization request, which carries therewith the content information to be categorized or also carries the address information of the content for the content categorization providing entity to obtain the corresponding content information in accordance with the address information, according to the categorization ability of the content categorization providing entity.

Step 404: The content categorization providing entity performs categorization according to the content information provided by the content categorization request entity and in accordance with the categorization ability supported by the content categorization request entity.

Step 405: The content categorization providing entity feeds back the corresponding content categorization result to the content categorization request entity.

As should be noted, the categorization ability negotiation between the content categorization request entity and the content categorization providing entity can also be realized by the following mode, namely, attaching an additional content categorization ability descriptive explanation in the interacting process of any content categorization. For instance, at the same time when the content categorization request entity transmits the content information to the content categorization providing entity to request for categorization, the categorization ability information is carried therewith; the content categorization providing entity carries its categorization ability information while returning the categorization result, and it is also possible to carry the corresponding categorization ability information, etc. in the authentication message and the authentication response message.

The specific process of the content categorization ability descriptive information attached in the content categorization request and response message (the specific form of the message is not limited, and it is possible to include the authentication interaction message, the association of content with category request and the response message, etc.) is as shown in the following Embodiment 3, and includes the following steps:

Step S11: The content categorization request entity transmits the content categorization request (which may include the content information or the address information of the content) to the content categorization providing entity, and the request includes the categorization ability information supported by the content categorization request entity.

Step S12: If the content categorization providing entity cannot identify the content information, the content categorization providing entity returns error information, attaches the categorization ability information supported by the content categorization providing entity, and the process goes to step S13; if the content categorization providing entity can identify the content information, the process goes to step S14.

Step S13: The content categorization request entity reorganizes the content according to the categorization ability supported thereby as returned by the content categorization providing entity and transmits the content information again to the content categorization providing entity to request for categorization.

Step S14: The content categorization providing entity performs content categorization according to the categorization ability supported by the content categorization request entity.

Step S15: The content categorization providing entity returns the content categorization result of step S14 to the content categorization request entity.

Moreover, if the process is performed according to S11-S12-S14, i.e. the content categorization providing entity can identify the content information transmitted from the content categorization request entity, the content categorization result returned by the content categorization providing entity in step S15 can carry the categorization ability information supported thereby, and, after receiving the categorization ability information supported thereby as provided by the content categorization providing entity, the content categorization request entity can further store the categorization ability information supported by the content categorization providing entity, and can specifically store the information in the mode of establishing a mapping relationship table, for example, to establish a mapping relationship table for the content categorization providing entity and the categorization ability supported by the content categorization providing entity. This is to provide the content information of the categorization ability supported by the content categorization providing entity in accordance with the mapping table at the next time when categorization is requested from the content categorization providing entity. It is thus possible to cancel the categorization ability supported by the content categorization providing entity as negotiably provided from the subsequent content categorization request interaction, and merely to negotiably provide the categorization ability supported by the content categorization request entity, thereby simplifying the interactive process of content categorization, and enhance the efficiency of content categorization. Furthermore, the content categorization request entity can further subscribe the content categorization ability changing information from the content categorization providing entity—see the detailed description in Embodiment 5 for the specific process thereof.

Of course, in other modes of execution described in the embodiments of the present invention, after obtaining the categorization ability information supported by the content categorization providing entity, the content categorization request entity can in all cases store the categorization ability supported by the content categorization providing entity by establishing a mapping relationship table, and can further subscribe the categorization ability changing information. Similarly, the content categorization providing entity can also store the categorization ability supported by the content categorization request entity after obtaining the categorization ability supported by the content categorization request entity, and can also store the ability by establishing a mapping relationship table; it is thus possible to cancel the categorization ability supported by the content categorization request entity as negotiably provided from the content categorization request interaction, and merely to negotiably provide the categorization ability supported by the content categorization providing entity, thereby simplifying the interactive process of content categorization, and enhance the efficiency of content categorization. If both of the entities store the corresponding categorization abilities, it suffices to query in advance the categorization ability supported by the other party in the content categorization request, and then to adjust the corresponding content information format according to the categorization ability, or to adjust the categorization rule, so as to quickly, highly efficiently and successfully complete such operations related to the categorization ability as the content categorization request or the association request (when the aforementioned process is directed to the association of content with category).

As understandable, after the content categorization request entity stores the categorization ability obtained from the content categorization providing entity or the content categorization providing entity stores the categorization ability supported by the content categorization request entity, each of the embodiments of the present invention can further includes the following steps:

It is determined whether valid categorization ability of the content categorization providing entity or the categorization ability supported by the content categorization request entity has been stored. The valid categorization ability can be determined by the methods such as determining whether storage of the information has exceeded the preset validity period, whether the stored categorization ability information is complete, and whether a corresponding control strategy is conformed with when there is strategy control, and so on. If the valid categorization ability of the content categorization providing entity has been stored, association of content with category is requested from the content categorization providing entity according to the stored categorization ability of the content categorization providing entity, or categorization is performed according to the categorization ability supported by the content categorization request entity, and the corresponding categorization result is returned. If the valid categorization ability of the content categorization providing entity has not been stored, a categorization ability negotiation request or a subscription request is transmitted to the content categorization providing entity, and association of content with category is requested from the content categorization providing entity according to the categorization ability received from the content categorization providing entity.

As should be explained, the similar method can be employed for the reverse content categorization ability negotiation, with the following specific steps as how to negotiate:

In step S21, the content categorization request entity transmits the content categorization request (including the content information) to the content categorization providing entity, and the request does not include the categorization ability information supported by the content categorization request entity.

In step S21, the content categorization request entity transmits the content categorization request (including the content information) to the content categorization providing entity, and the request does not include the categorization ability information supported by the content categorization request entity.

Steps S22-S23 are the same as steps S12-S13.

Step S24: The content categorization providing entity performs content categorization according to the content information provided by the content categorization request entity.

Step S25: The content categorization providing entity returns the content categorization result of step S24 to the content categorization request entity.

Step S26: The content categorization request entity receives the content categorization result returned by the content categorization providing entity, the categorization is successful and the process is ended if the result is supported thereby; however, if the categorization result is not supported thereby, the content categorization request entity returns an error message to the content categorization providing entity, and simultaneously attaches the categorization ability information supported by the content categorization request entity.

Step S27: The content categorization providing entity performs the content categorization again according to the received categorization ability information supported by the content categorization request entity.

Step S28: The content categorization providing entity returns the content categorization result of step S27 to the content categorization request entity. If the process is performed according to S21-S22-S24, i.e. when the content categorization providing entity can identify the content information transmitted from the content categorization request entity, it is possible to further carry the categorization ability information supported by the content categorization providing entity in the categorization result message returned from step S25 or S28, so that the content categorization request entity stores the categorization ability information.

As should be noted, the interactive process of content categorization is added to the two aforementioned embodiments in a certain sense, and if the initial content formats are not matched, there will be several rounds of mutual information interactions. However, the process of content categorization ability negotiation is reduced in the scenario of relatively simple content format, and this facilitates enhancement of the speed and efficiency of content categorization.

Specific process of the content categorization ability descriptive information carried in the content categorization initial request message is described in the following Embodiment 4, and includes the following steps:

Step S31: The content categorization request entity transmits the content categorization initial request message, which is not restricted in type, and which includes the categorization ability information supported by the content categorization request entity and the format information of the content information to be categorized for transmission.

Step S32: The content categorization providing entity returns an initial request response message to the content categorization request entity. If the content categorization providing entity supports the format of the content information, it returns an initial request success response message; if the content categorization providing entity does not support the format of the content information, the content categorization providing entity attaches the categorization ability information supported by the content categorization providing entity in the returned initial request response message.

Step S33: The content categorization request entity transmits a content categorization message, which includes the content information, to the content categorization providing entity according to the initial request response message of the content categorization providing entity.

Step S34: The content categorization providing entity performs content categorization according to the categorization ability supported by the content categorization request entity.

Step S35: The content categorization providing entity returns the content categorization result of step S34 to the content categorization request entity.

Of course, it is also possible not to include the categorization ability information supported by the content categorization request entity in the content categorization initial request message transmitted in step S31, but to include only the information describing the format of the content information to be categorization for transmission, with the following specific steps:

Step S41: The content categorization request entity transmits a content categorization initial request message that includes the format information of the content information to be categorized for transmission.

Step S42: The content categorization providing entity returns an initial request response message to the content categorization request entity, if the content categorization providing entity supports the format of the content information, it returns an initial request success response message; if the content categorization providing entity does not support the format of the content information, the content categorization providing entity attaches the categorization ability information supported by the content categorization providing entity in the returned initial request response message.

Step S43: The content categorization request entity transmits a content categorization request message, which includes the content information, to the content categorization providing entity according to the initial request response message of the content categorization providing entity.

Step S44: The content categorization providing entity performs content categorization according to the content information provided by the content categorization request entity.

Step S45: The content categorization providing entity returns the content categorization result of step S44 to the content categorization request entity.

Step S46: The content categorization request entity receives the content categorization result returned by the content categorization providing entity, the categorization is successful and the process is ended if the result is supported thereby; however, if the categorization result is not supported thereby, the content categorization request entity returns an error message to the content categorization providing entity, and simultaneously attaches the categorization ability information supported by the content categorization request entity.

Step S47: The content categorization providing entity performs the content categorization again according to the received categorization ability information supported by the content categorization request entity.

Step S48: The content categorization providing entity returns the content categorization result of step S47 to the content categorization request entity. If the content categorization providing entity does not return the categorization ability supported thereby to the content categorization request entity in step S42, the content categorization providing entity can further carry the categorization ability information supported thereby in the categorization result message returned in step S45 or step S48, so that the content categorization request entity stores the categorization ability information.

Similarly, this embodiment possesses the technical effect that possessed by Embodiment 3. Furthermore, by comparing with Embodiment 3, this embodiment has the following effect: Negotiation is performed by transmitting the content categorization initial request message to carry the format information of the content to be categorized, while the content information is not directly transmitted. In this way, even if the content categorization providing entity does not support the format of the content information, the content information will not be erroneously transmitted to waste the previous interaction, thereby further providing fast negotiation of the content categorization ability and high efficiency of content categorization.

During the process of practical application, the content categorization providing entity or the content categorization request entity can obtain the categorization ability of the other party in the mode of subscription. Moreover, because the categorization ability supported by the content categorization providing entity or the content categorization request entity might change, while this is not known to the other party, the content categorization providing entity or the content categorization request entity can further subscribe the categorization ability changing circumstances of the other party, so that the embodiment of the present invention provides a technical solution in which subscription of the categorization ability is supported and notification is performed when the categorization ability has changed.

Figure 5:
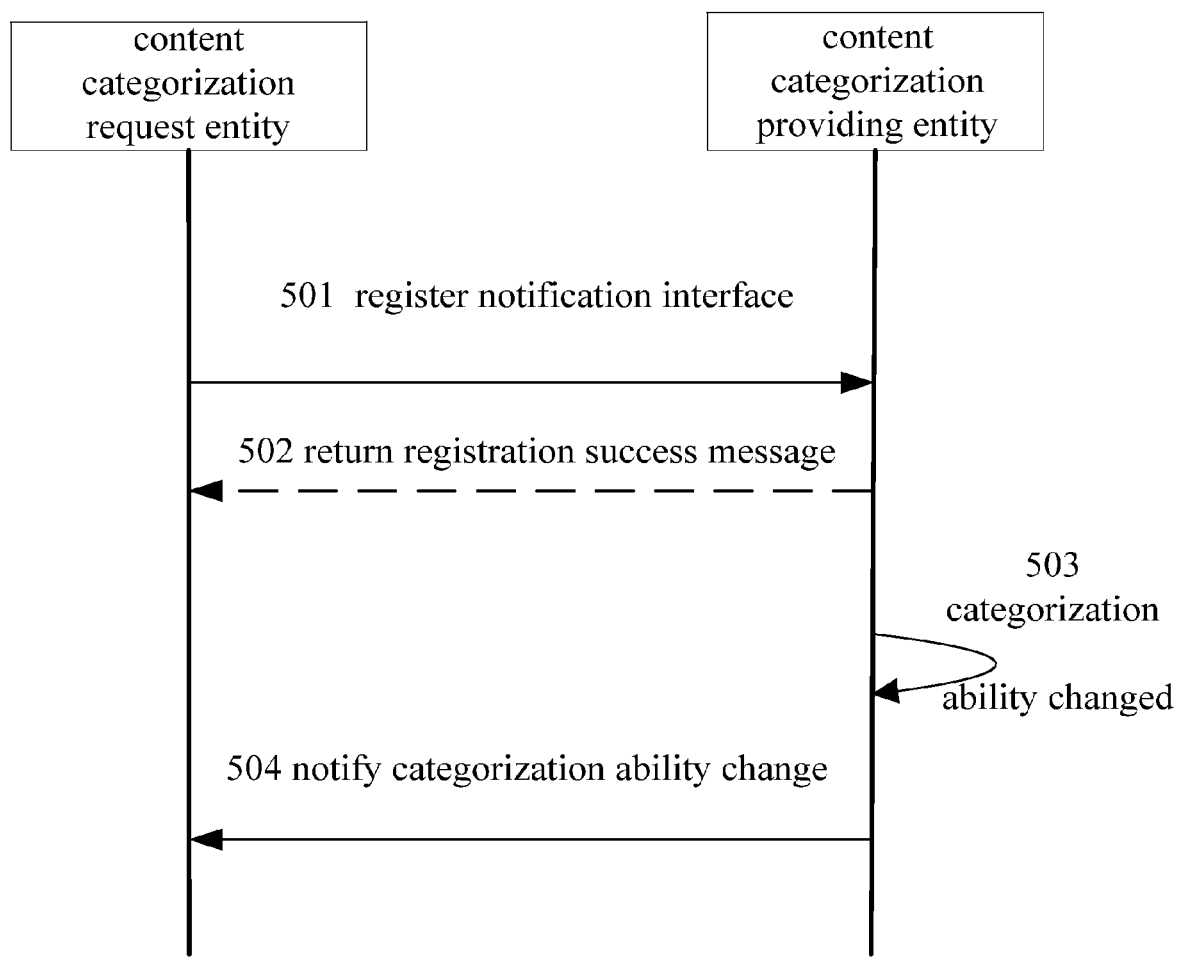
FIG. 5 is a flowchart illustrating a method for content categorization provided by Embodiment 5 of the present invention.

Correspondingly, it is possible to realize the technical solution of notifying that the categorization ability has changed according to a mechanism for subscription. That is, on the one hand the other party registers a notification interface of its own, and this step can be completed in the process of beforehand development or by manual configuration, and logically expressed as the registered interface, the realization thereof is explained later. When the content categorization ability has changed, the changed party timely notifies the registered party via the registered interface. This mechanism for subscription notification can be applied in the various embodiments mentioned above, and what is explained in detail here is merely the mechanism process of notifying the change of the categorization ability, specifically in the following embodiment:

The content categorization request entity wants the content categorization providing entity to timely obtain the notification when the categorization ability has changed. The specific process is as shown in FIG. 5, which is a flowchart illustrating a method for content categorization provided by Embodiment 5 of the present invention, and specifically includes the following steps:

Step 501: The content categorization request entity registers a notification message interface to the content categorization providing entity.

It is usual under such a circumstance for the following several modes to complete registration of the notification message interface.

1. The content categorization request entity directly transmits the registration message to the content categorization providing entity.

2. The content categorization providing entity internally configures the notification interface of the content categorization request entity, i.e. the content categorization providing entity can read its own configuration file Config.ini, wherein one line of configuration of the notification message interface is provided as:

```
Config.ini
...
Notify = http://www.cbcs.com/notify
...
```

3. The content categorization providing entity is fixed with a notification interface during development, and the content categorization request entity configures according to the fixed standard, i.e. the content categorization providing entity transmits a broadcasting message to an address prescribed by itself when the function has changed, for instance, by transmitting a notification message to 192.168.1.254:9999, and if the content categorization request entity wishes to learn of the ability change of the content categorization providing entity, it can listen the broadcasting message at the port of 192.168.1.254:9999.

4. Both of the entities configure certain notification interfaces in conformity with a promulgated standard.

Step 502: The content categorization providing entity returns a registration success message. This is an optional step in the process of practical application.

Step 503: When the content categorization ability of the content categorization providing entity has changed, the content categorization providing entity prepares to notify the content categorization ability change notification message.

Step 504: The content categorization providing entity notifies the change of the categorization ability according to the interface registered by the content categorization request entity.

An example is taken below, in which the content categorization request entity provides a section of a new motion picture A.mpg for a provider A and wishes that the motion picture can be categorized through a CBCS server, to explain in greater detail the process of the method described in the foregoing embodiment of the present invention.

Moreover, to make the explanation clearer and easier for comprehension, it is supposed in this embodiment that:

1. the provider A supports the Chinese movie categorization standard, namely CN-Classification; and 2. the CBCS server only supports motion pictures in the form of MPG, and supports motion picture information description of MPEG-21.

Figure 6:
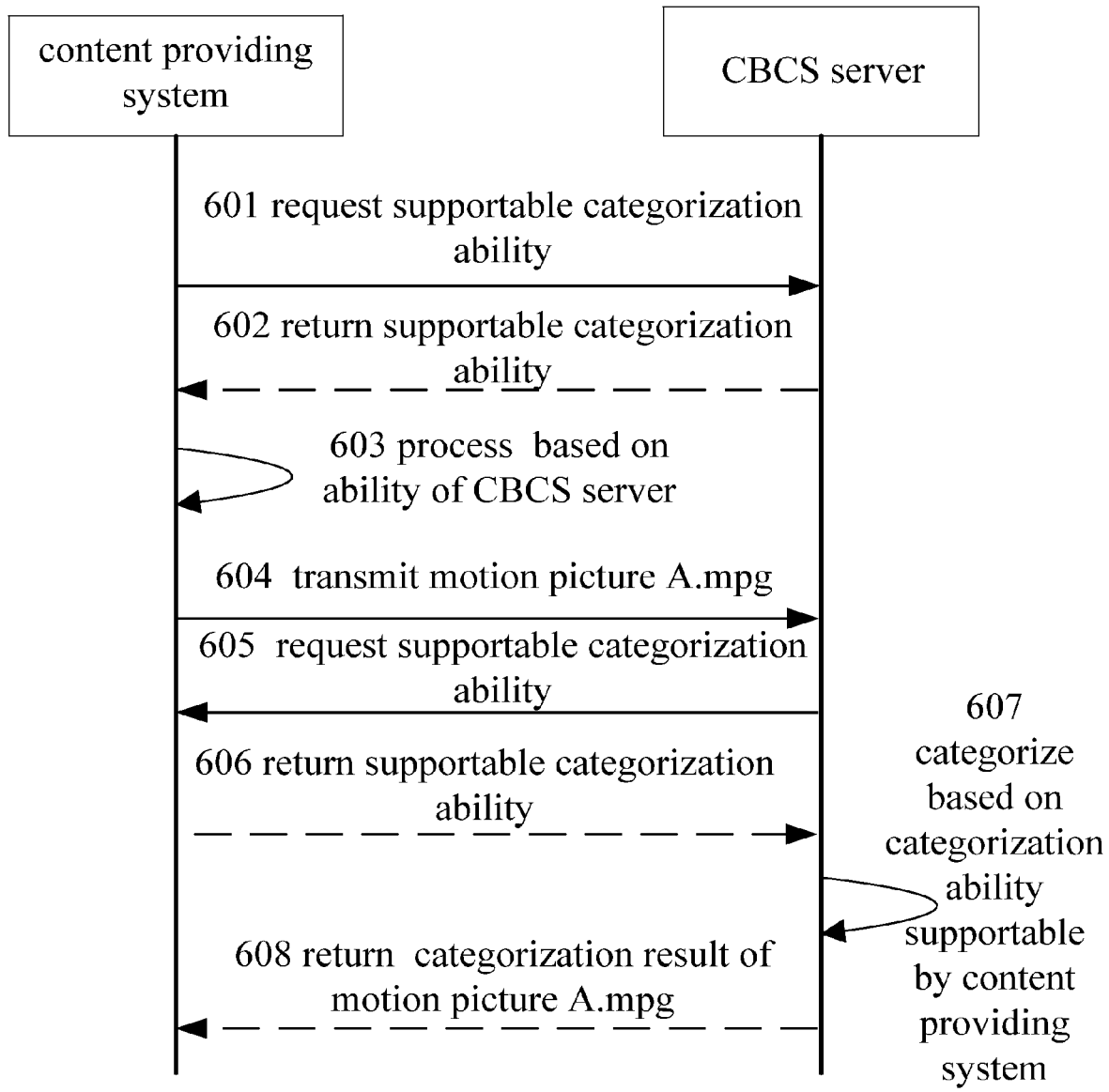
FIG. 6 is a flowchart illustrating another method for content categorization provided by Embodiment 5 of the present invention.

Referring to FIG. 6, which is a flowchart illustrating another method for content categorization provided by Embodiment 5 of the present invention, the following steps are specifically included:

Step 601: The content providing system of the provider A transmits a content categorization ability request to the CBCS server.

The categorization ability supported by the CBCS server is requested by transmitting a content categorization request, for instance, by the following OPTION command:

```
<CBCSCommand>
    <OPTION CmdID = "1"/>
</CBCSCommand>
```

Step 602: The CBCS server returns the categorization abilities supported thereby.

For instance, the categorization abilities supported thereby returned in this embodiment are as follows: The supported content types are MEG, MPEG-21 and JPEG/GIF, the supported content code is gzip, the supported languages are Danish and English, the acceptable maximum content length is 4096BYTE, the supported content locators are URI and SMS short codes, the supported content identifiers are ISBN and ISAN, the supported digital abstract algorithms of the content abstract are MD5, SHA-1 and RIPEMD-160, the supported reduction formats of the content abstract are AutoTXT and Movie, the supported categorization rules are CN-Classification, ESRB, MPAA and ICRA, the supported signature algorithms are RSA (which supports the corresponding digital abstract algorithms of MD-5, SHA-1 and RIPEMD-160), DSA (which supports the corresponding digital abstract algorithm of MD-5) and ECDSA (which supports the corresponding digital abstract algorithm of MD-5). The returned information formats are as follows:

```
<CBCSCommand>
    <ContentType RefCmd= "1">
        <MPG/>
        <MPEG-21/>
        <JPEG/GIF>
    </ContentType>
<ContentEncoding>
<gzip>
</ContentEncoding>
<ContentLanguage>
<da>
<en>
</ContentLanguage>
<ContentLength>
<4096>
</ContentLength>
<ContentLocator>
<URI>
<SMS>
</ContentLocator>
<ContentIdentifier>
<ISBN>
<ISAN>
</ContentIdentifier>
<ContentDigest_DigitalDigest>
<MD5>
<SHA-1>
<RIPEMD-160>
</ContentDigest_DigitalDigest>
<ContentDigest_ReduceForm>
<AutoTXT>
<Movie>
</ContentDigest_ReduceForm>
<CategorizationScheme>
<CN-Classification>
<MPAA>
<ESRB>
<ICRA>
</CategorizationScheme>
<Signature>
<RSA>
<MD-5>
<SHA-1>
<RIPEMD-160>
```

```
        </RSA>
        <DSA>
            <MD-5>
        </DSA>
        <ECDSA>
            <MD-5>
        </ECDSA>
    </Signature>
</CBCSCommand>
```

Step 603: The content providing system of the provider A revises the content format of A.mpg according to the returned support format, uses MPEG-21 to describe the content and packs the content via ZIP.

Specifically, in accordance with the obtained content categorization ability of the CBCS server, the content providing system of the provider A determines the content type that is provided for the CBCS server to categorize contents according to ContentType, determines the coding format that is provided for the CBCS server to compress the contents to be categorized according to ContentEncoding, determines the content description language that is provided for the CBCS server to categorize contents, determines the content maximum length that is provided for the CBCS server to categorize contents according to ContentLength, determines the content locator type that is provided for the CBCS server to categorize contents according to Contentlocator, determines the content identifier type that is provided for the CBCS server to categorize contents according to ContentIdentifier, determines the digital digest corresponding algorithm of the content digest that is provided for the CBCS server to categorize contents according to ContentDigest_DigitalDigest, determines the corresponding type of the reduction form of the content digest that is provided for the CBCS server to categorize contents according to ContentDigest_ReduceForm, determines the categorization rule requested thereby and supported by the CBCS server according to CategorizationScheme, and determines the signature algorithm of the confidence verification supported by the CBCS server according to Signature. When the content categorization request entity is an entity (such as a content screening entity) that should be verified, this parameter is especially valid, and the entity can determine the configuration of the signature algorithm supported thereby according to this value.

Step 604: The content providing system of the provider A transmits a categorization request to the CBCS server, with the re-formatted A.mpg attached therewith. The corresponding command formats are as follows:

```
<CBCSCommand>
    <Categorization CmdID = "2"/>
    <Content>
        <......>
    </Content>
</CBCSCommand>
```

Step 605: The CBCS server requests the supported categorization ability, such as the categorization format, from the content providing system of the provider A, by the following OPTION commands:

```
CBCSCommand>
    <OPTION CmdID = "4"/>
</CBCSCommand>
```

Step 606: The content providing system of the provider A returns the categorization ability, such as the categorization format, supported thereby to the CBCS, by the following commands:

```
<CBCSCommand>
    <ContentType RefCmd="4">
        <CN-Classification/>
    </ContentType>
</CBCSCommand>
```

Step 607: The CBCS server categorizes the A.mpg according to the supported categorization ability (categorization standard CN-Classification) returned by the content providing system of the provider A.

Step 608: The CBCS server returns the categorization results of the foregoing steps, by the following commands:

```
<CBCSCommand>
    <CategorizationRes RefCmd="2">
        <Level 3>
    </CategorizationRes>
</CBCSCommand>
```

Moreover, it is possible to apply the aforementioned mechanism for content categorization ability change notification to this embodiment, i.e. in the case the provider A wants to be timely notified when the categorization ability supported by the CBCS server has changed. For instance, the CBCS server in this embodiment originally supports MPEG-21, but with the subsequent change in the system the ability for support becomes MPEG-7, so that it is necessary to timely notify the provider A.

Figure 7:
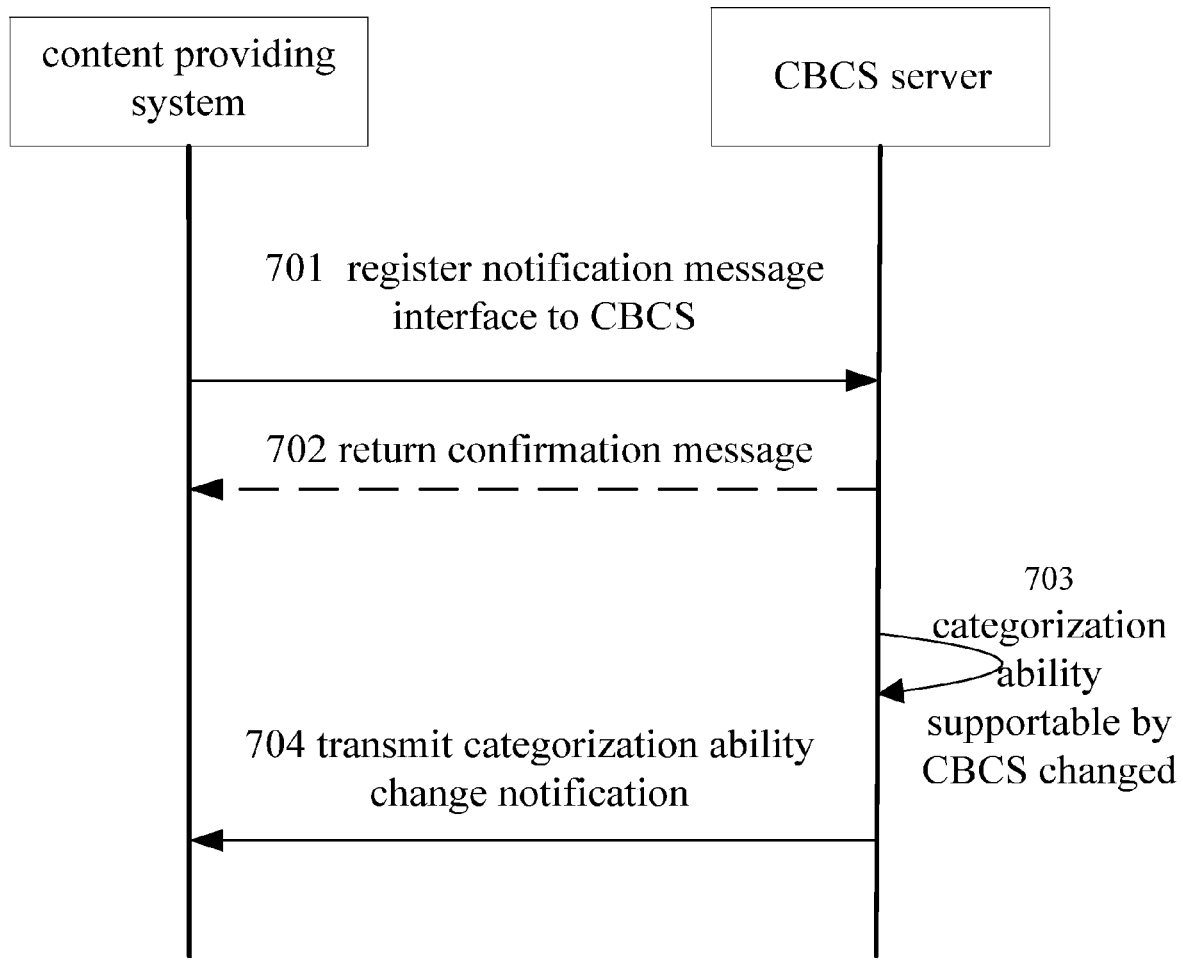
FIG. 7 is a flowchart illustrating still another method for content categorization provided by Embodiment 5 of the present invention.

The specific process is as shown in FIG. 7, which is a flowchart illustrating still another method for content categorization provided by Embodiment 5 of the present invention, and includes the following steps:

Step 701: The content providing system of the provider A transmits a registration request to the CBCS server to register its notification message interface. The specific command format can be as follows:

```
<CBCSCommand>
    <NotificationReg CmdID = "1" Address =
    http://www.sp1.com/cbcs/notification />
</CBCSCommand>
```

Step 702: The CBCS server returns a acknowledgement message to the content providing system of the provider A, with the following specific format:

```
<CBCSCommand>
    <NotificationRsp> OK </NotificationRsp>
</CBCSCommand>
```

Step 703: The categorization ability supported by the CBCS server has changed, and the CBCS determines the categorization ability change content to form a change notification message.

Step 704: The CBCS server notifies the content providing system of the provider A of the result of its categorization ability change via the aforementioned interface, with the specific message format as follows:

```
TO: http://www.sp1.com/cbcs/notification /
<CBCSCommand>
    <Notification/>
    <ContentType RefCmd= "1">
        <MPEG-7/>
    </ContentType>
</CBCSCommand>
```

As can be known from the description of the above embodiments and modes of execution, the embodiments of the present invention can fully learn of the content categorization ability through the categorization ability negotiation or the subsequent updating operations of the categorization ability. Therefore, the content categorization request entity or the content categorization providing entity can obtain the mutual content categorization ability information in a detailed, clear, accurate and timely manner. In this way, it is easy for the subsequent content categorization request entity to pertinently request the content categorization, and for the content categorization providing entity to pertinently perform the content categorization and provide the content categorization result. Thus, the possibility of failure for content categorization is reduced due to lack of support of the mutual categorization abilities between the content categorization entities, and the efficiency of content categorization is increased. On the other hand, serving as the content categorization request entity, when the content screening entity needs to be confidence-verified, it is possible to obtain the digital signature algorithm provided by the content categorization providing entity for performing confidence verification of the pre-categorized information through the categorization ability negotiation. In this way, it is possible to help the content screening entity configure the corresponding algorithm in advance, thus ensuring check on the pre-categorized content.

As can be clearly known to those skilled in the art through the description of the foregoing embodiments, the present invention can be realized by hardware, or realized by the necessary hardware platform with the aid of software. On the basis of such understanding, the technical solution of the present invention can be embodied in the form of a software product, which can be stored in a nonvolatile storage medium (such as a CD-ROM, a U disk, a mobile hard disk, and the like), and includes plural instructions enabling a computer device (such as a personal computer, a server, or a network device) to execute the method recited in each embodiment of the present invention.

Apparently, it is possible for those skilled in the art to make variations and modifications to the embodiments of the present invention without departing from the spirit and scope of the present invention. Accordingly, if these variations and modifications to the embodiments of the present invention fall within the purview of the claims of the present invention or equivalent thereof, it is intended for the present invention to also cover these variations and modifications.

What is claimed is:

1. A method for content categorization, comprising:
    transmitting, by a content categorization request entity, a categorization ability negotiation request to a content categorization providing entity to request categorization ability of the content categorization providing entity;
    receiving, by the content categorization request entity, the categorization ability of the content categorization providing entity from the content categorization providing entity;
    requesting, by the content categorization request entity, association of content with category from the content categorization providing entity according to the categorization ability, wherein prior to transmitting the categorization ability negotiation request to the content categorization providing entity, the method further comprises:
    determining, by the content castegorization request entity, whether valid categorization ability of the content categorization providing entity has been stored;
    if the valid categorization ability of the content categorization providing entity has been stored, requesting, by the content categorization request entity, association of content with category from the content categorization providing entity according to the stored categorization ability of the content categorization providing entity; and
    if the valid categorization ability of the content categorization providing entity has not been stored, transmitting, by the content content categorization request entity, the categorization ability negotiation request to the content categorization providing entity, for requesting association of content with category from the content categorization providing entity according to the categorization ability.

2. The method for content categorization according to claim 1, further comprising:
    requesting, by the content categorization request entity, content categorization from the content categorization providing entity according to the categorization ability; and
    receiving, by the content categorization request entity, a categorization result of the content from the content categorization providing entity.

3. The method for content categorization according to claim 1, wherein requesting association of content with category from the content categorization providing entity according to the categorization ability comprising:
    correspondingly processing the content to be categorized according to the categorization ability, to request association of content with category from the content categorization providing entity with the processed content.
    determining, by the content categorization request entity, whether valid categorization ability of the content categorization providing entity has been stored;
    if the valid categorization ability of the content categorization providing entity has been stored, requesting, by the content categorization request entity, association of content with category from the content categorization providing entity according to the stored categorization ability of the content categorization providing entity; and
    if the valid categorization ability of the content categorization providing entity has not been stored, transmitting, by the content categorization request entity, the categorization ability negotiation request to the content categorization providing entity, for requesting association of content with category from the content categorization providing entity according to the categorization ability.

4. The method for content categorization according to claim 1, wherein the categorization ability negotiation request is carried in one of the following messages:
    a content categorization ability negotiation request message, a content categorization request message, an authentication message, and an association of content with category request message.

5. The method for content categorization according to claim 1, wherein receiving categorization result returned by the content categorization providing entity comprising:
    receiving, by the content categorization request entity, the categorization result of categorizing the content by the content categorization providing entity according to the categorization ability supported by the content categorization request entity.

6. The method for content categorization according to claim 1, further comprising:
   receiving, by the content categorization request entity, the categorization ability negotiation request from the content categorization providing entity; and
   returning, by the content categorization request entity, the categorization ability supported by the content categorization request entity to the content categorization providing entity.

7. The method for content categorization according to claim 1, after receiving the categorization ability of the content categorization providing entity from the content categorization providing entity, further comprising,
   configuring categorization ability and/or confidence verification ability supported by the content categorization request entity according to the categorization ability.

8. A content categorization request entity, comprising:
   a determining unit, configured to determine whether valid categorization ability of the content categorization providing entity has been stored prior to transmitting the categorization ability negotiation request to the content categorization providing entity, and request, if valid categorization ability of the content categorization providing entity has been stored, association of content with category from the content according to the stored categorization ability of the content categorization providing entity;
   a categorization ability requesting unit, configured to request categorization ability from a content categorization providing entity if the valid categorization ability of the content categorization providing entity has not been stored;
   a categorization ability receiving unit, configured to receive the categorization ability of the content categorization providing entity from the content categorization providing entity;
   wherein the categorization ability of the content categorization providing entity includes one of the following: a content locator supported by the content categorization providing entity; a content identifier supported by the content categorization providing entity; and a content abstract type supported by the content categorization providing entity;
   a transmitting unit, configured to request association of content with category from the content categorization providing entity according to one of the category abilities of the content category providing entity; and
   a receiving unit, configured to receive an association result of the content from the content categorization providing entity.

9. The content categorization request entity according to claim 8, the transmitting unit further configured to request content categorization from the content categorization providing entity according to the category ability of the content category providing entity; and further comprising:
   a receiving unit, configured to receive a categorization result of the content from the content categorization providing entity.

10. The content categorization request entity according to claim 8, further comprising:
   a content processing unit, configured to correspondingly process content information to be categorized according to the categorization ability, and request content categorization from the content categorization providing entity via the transmitting unit with the processed content information.

11. The content categorization request entity according to claim to claim 8, wherein the categorization ability negotiation request is carried in one of the following messages:
   a content categorization ability negotiation request message, a content categorization request message, an authentication message, and an association of content with category request message.

12. A system for content categorization, comprising:
   a content categorization request entity, configured to transmit a categorization ability negotiation request to a content categorization providing entity to request categorization ability of the content categorization providing entity, receive the categorization ability of the content categorization providing entity from the content categorization providing entity, wherein the categorization ability of the content categorization providing entity includes one of the following: a content locator supported by the content categorization providing entity; a content identifier supported by the content categorization providing entity; and a content abstract type supported by the content categorization providing entity; request association of content with category from the content categorization providing entity according to one of the categorization abilities; receive an association result from the content categorization providing entity; and
   the content categorization providing entity, configured to receive the categorization ability negotiation request from the content categorization request entity, return the categorization ability of the content categorization providing entity to the content categorization request entity, receive a request for association of content with category from the content categorization request entity, to associate the content with the category; associate content with category according to the association request when a category to which content corresponds is present; categorize the content to obtain a category and associate the content with the category if no category to which content corresponds is present; and return the association result to the content categorization request entity.

13. The system for content categorization according to claim 12, wherein the content categorization request entity further configured to request content categorization from the content categorization providing entity according to the categorization ability and receive a categorization result of the content from the content categorization providing entity, and
   wherein the content categorization providing entity further configured to receive a content categorization request from the content categorization request entity according to the categorization ability, categorize the content according to the content categorization request and the categorization ability supported by the content categorization request entity; and return a categorization result to the content categorization request entity.

14. The system for content categorization according to claim 12, wherein the categorization ability negotiation request is carried in one of the following messages:
   a content categorization ability negotiation request message, a content categorization request message, an authentication message, and an association of content with category request message.

* * * * *